April 5, 1932.  H. B. KASTER  1,852,166
POSITION FINDER
Filed Sept. 24, 1929  4 Sheets-Sheet 1

INVENTOR.
HOWARD B. KASTER.
BY Munn & Co.
ATTORNEYS.

April 5, 1932. H. B. KASTER 1,852,166
POSITION FINDER
Filed Sept. 24, 1929 4 Sheets-Sheet 2

INVENTOR.
Howard B. Kaster.
BY Munn & Co.
ATTORNEYS.

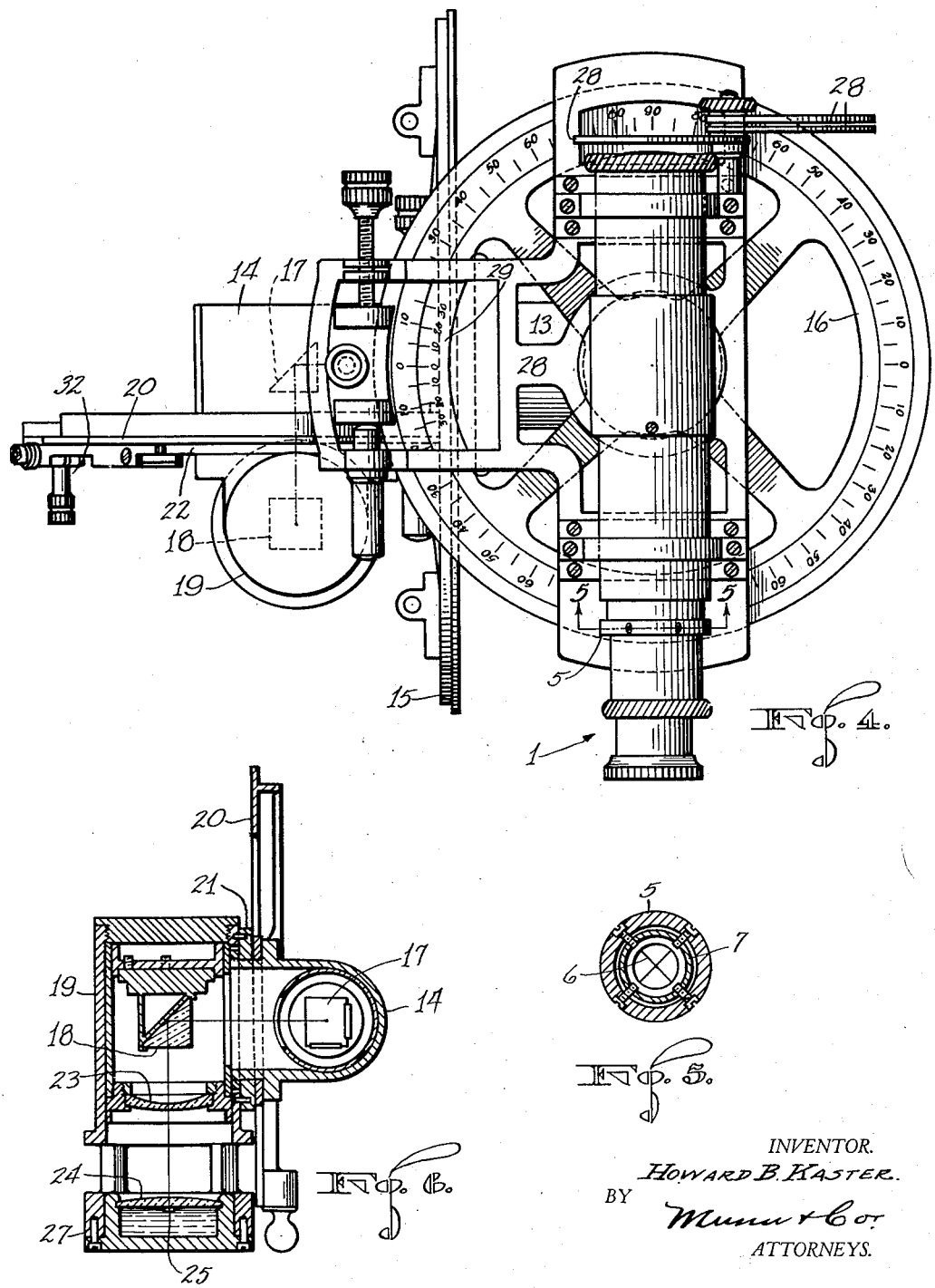

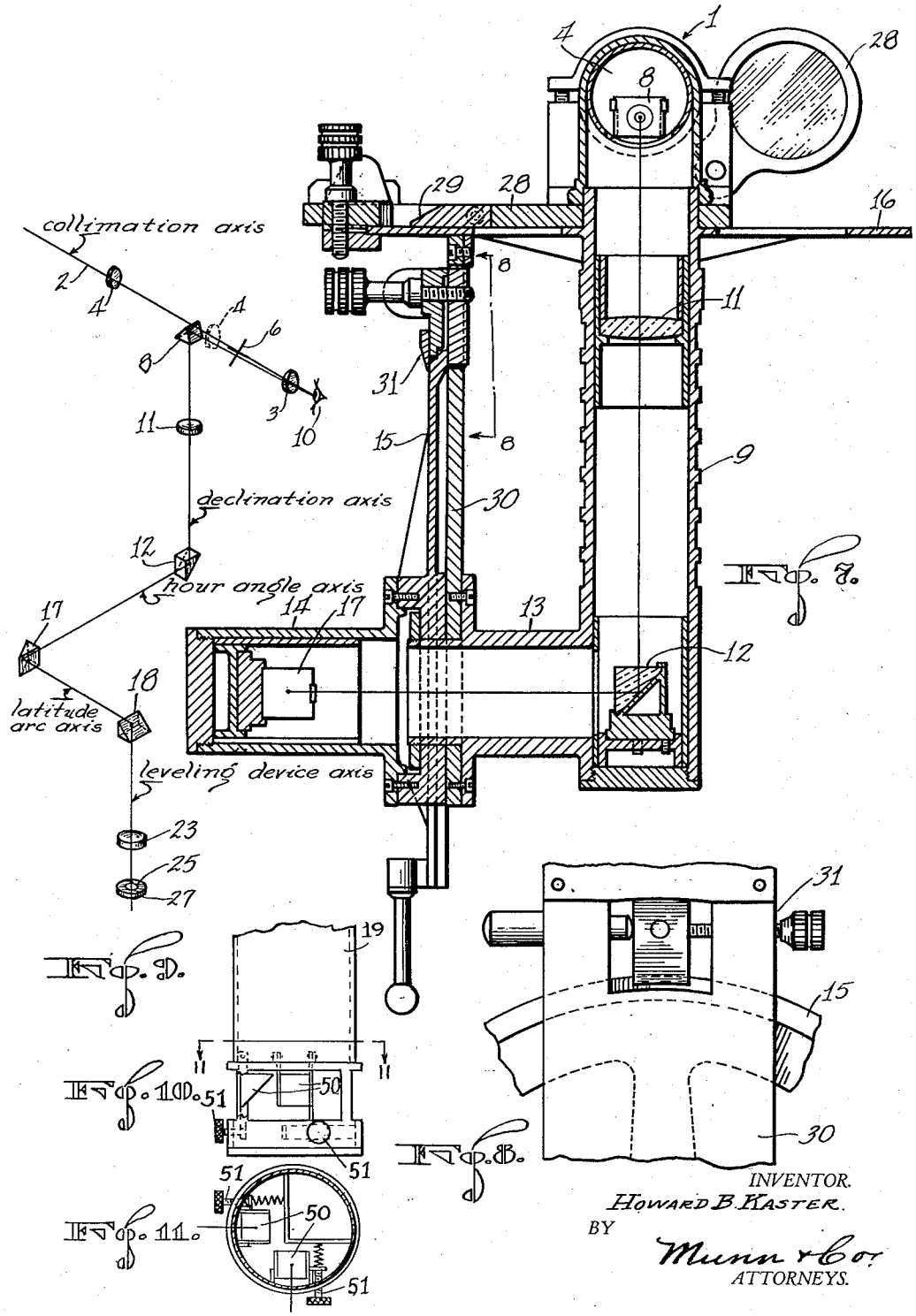

Patented Apr. 5, 1932

1,852,166

UNITED STATES PATENT OFFICE

HOWARD B. KASTER, OF BERKELEY, CALIFORNIA, ASSIGNOR TO KASTER SPHERANT COMPANY, OF ALAMEDA COUNTY, CALIFORNIA, A COPARTNERSHIP CONSISTING OF HOWARD B. KASTER, RAY B. BENSON AND JESSE G. BENSON

POSITION FINDER

Application filed September 24, 1929. Serial No. 394,888.

My invention relates to improvements in position finders, and it consists in the combinations, constructions and arrangements hereinafter described and claimed.

An object of my invention is to provide a position finder used primarily as a navigation instrument and which will give directly and without computation the solutions for the hour angle or the latitude of the so-called astronomical triangle.

The instrument will, upon observation of an astronomical body of known declination, give directly either:

(a) The solution for apparent hour angles of an astronomical triangle the sides of which are the apparent zenith distance and the apparent polar distance of the observed body, and the complement of any assumed latitude which has been set off on the latitude arc of the instrument.

(b) The solution for latitude of an astronomical triangle, two of the sides of which are the apparent zenith distance and apparent polar distance of the observed body, the included angle being any assumed hour angle which has been set off on the hour angle arc of the instrument.

Other objects and advantages will appear as the specification proceeds, and the novel features of the invention will be particularly pointed out in the claims hereto annexed.

My invention is illustrated in the accompanying drawings forming a part of this application, in which:

Figure 4 is a plan view of the device,

Figure 5 is a section along the line 5—5 of Figure 4,

Figure 6 is a section along the line 6—6 of Figure 2,

Figure 7 is a section along the line 7—7 of Figure 1,

Figure 8 is a view looking in the direction of the arrows in Figure 7,

Figure 9 is a schematic showing of the lens and prisms,

Figure 10 is a side elevation of a part of the device showing a modified form, and Figure 11 is a section along the line 11—11 of Figure 10.

The instrument is essentially a telescope upon an equatorial mounting. An accurately graduated latitude arc is provided, as well as a leveling device which is seen in the telescope field by reflection, and by means of which the instrument is oriented with respect to either the direction of gravity or the apparent horizon.

Figure 1:
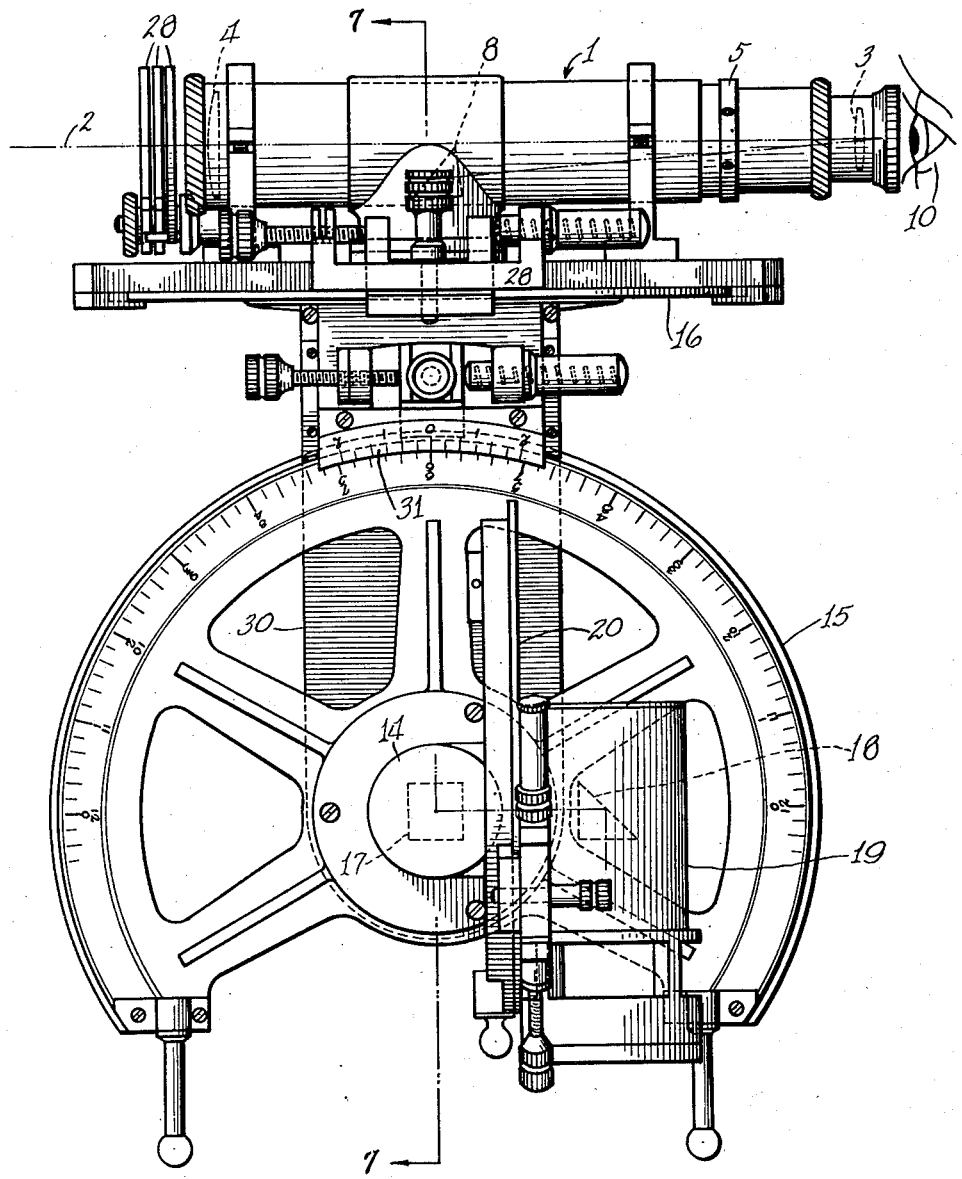
Figure 1 is a side elevation of the device.

Referring to Figure 1, it will be noted that a telescope indicated at 1 has a collimation axis 2, and Figure 9 further shows the telescope as being provided with an eyepiece 3 and an objective lens 4. The members 3 and 4 are shown in Figure 1. Figure 4 shows a top plan view of the telescope 1 and shows a ring 5 that carries cross hairs 6 (see Figure 5). These cross hairs are secured in a member 7 that is adjustably mounted in the telescope, and this member may be moved so as to cause the point of intersection of the hairs to coincide with the collimation axis 2.

Figure 1 shows a prism 8 mounted within the telescope 1 and shows how this prism is inclined so as to change light rays passing through the center of a hollow handle portion 9 at right angles and have them directed to the eye 10 of the observer. The telescope 1 has an opening which coincides with the hollow handle 9 and permits light rays passing through this handle to strike the prism. Figure 7 shows the prism 8 as being mounted in the telescope 1 and further shows light rays passing through the handle 9 and past a lens 11 disposed in the handle. At the bottom of the handle 9 I mount a second prism 12, and this causes the light rays to be reflected at right angles. The light rays will therefore pass through a tubular member 13. The tubular member 13 is an integral part of the handle 9. A tubular section 14 is axially aligned with the member 13 (see Figure 7) and is designed to be rotated with respect to this member. It will be seen from Figure 7 that the tube 14 is secured to an arc 15, and this arc is rotatably mounted upon the tube 13. The arc 15 will hereinafter be known as the hour angle arc.

It might be well to mention at this point that the telescope 1 is rotatably mounted on the handle 9 and moves over a circular member 16 (see Figures 1 and 4). This circular member will be hereinafter known as the declination circle. It should also be noted that the entire telescope may be set to the right of the prism 8 in Figure 1 rather than have the prism disposed within the telescope as is shown. This will move the objective lens 4 into the dotted line position shown in Figure 9. The function of the telescope will not be changed due to this movement.

Reference to Figures 1, 4, 6, 7 and 9 shows that a third prism 17 is mounted in the tube 14 and bends the light rays at right angles so as to strike a prism 18 disposed in a tubular member 19. The tube 19 is rotatable about a quadrant 20 which will hereinafter be known as the latitude arc. The tube 19 is secured to a ring 21 (see Figure 6) that in turn carries an arm 22 that slides over the latitude arc 20.

Figure 3:
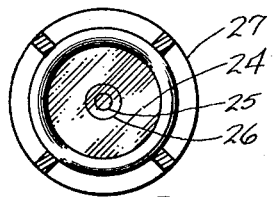
Figure 3 is a section along the line 3—3 of Figure 2.

The prism 18 reflects the light rays at right angles, and these rays pass through a negative lens 23 and then on into the center of a cover glass 24 covering a spirit bubble 25. The glass 24 and bubble 25 are shown in Figure 3 in plan view. The glass has a circle 26 thereon which at all times is centered with the cross hairs 6 due to the arrangement of the prisms. The various parts of the instrument may be moved with respect to each other without changing the apparent position of the circle 26 with respect to the hairs 6.

In reality, light rays will enter the instrument from the spirit level indicated generally at 27, and these rays will pass up to the eye 10 in the manner shown in Figure 9. The arrangement of the various parts permits the collimation axis 2 to be rotated about the axis of the handle 9, and further permits the hour angle arc to be rotated about the axis of the tube 13. The device further permits the tube 19 to be rotated about the latitude arc 20.

A horizon type of leveling device is shown in Figures 10 and 11. A combination of mirrors or total reflection prisms 50 are provided for sighting on two points of the horizon, preferably points about ninety degrees apart. The perpendicular to these reflecting surfaces 50 is capable of being tilted by set screws 51 with respect to the leveling device itself by an amount equal to one-half of the dip of the horizon, in order that after reflection the rays from the horizon points will always be parallel to a fixed line in the leveling device when this line is vertical. This line corresponds to the axis of the bubble cell type.

Figure 2:
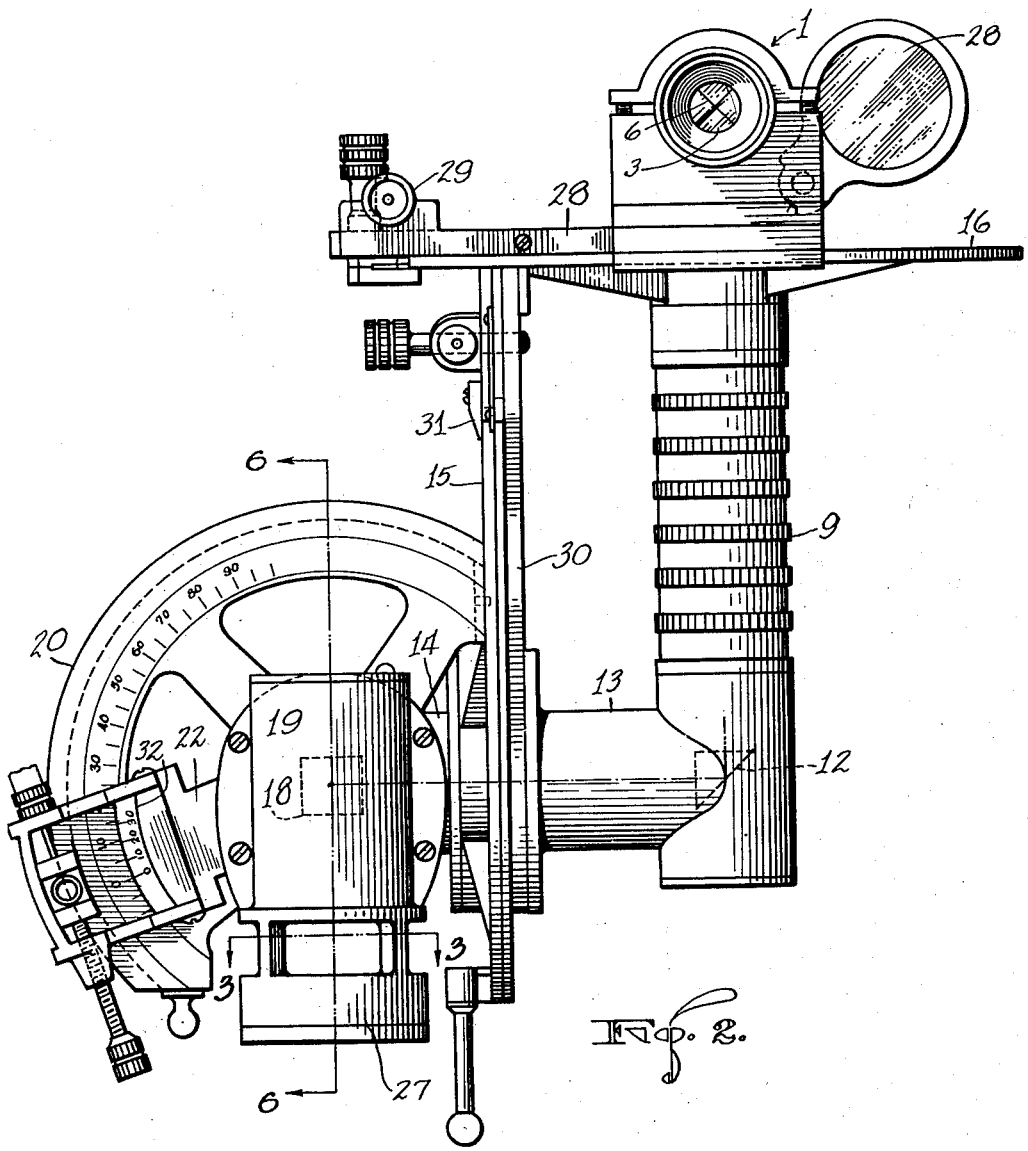
Figure 2 is a view taken at right angles to that of Figure 1.

Each adjustment of the instrument may be accomplished by means of a venier. For example, the telescope 1 carries an arm 28 that rides over the declination circle 16. A venier 29 is carried by this arm and permits an accurate adjustment. In like manner the supporting member 30 (see Figure 2) rigidly secured to the tube 13 and the handle 9, carries a vernier 31 that is designed to allow accurate adjustment of hour angle arc. The arm 22 is also provided with a vernier 32 that may be adjusted with respect to the latitude arc 20.

From the foregoing description of the various parts of the device, the operation thereof may be readily understood.

The collimation axis 2 of the telescope 1 is parallel to the plane of the declination circle 16 and is free to rotate about the axis of this circle. Such rotation is measured on the declination circle 16. Figure 4 shows the circle 16 as being graduated in degrees starting from two zeros disposed on opposite sides of the circles and increasing to two nineties also disposed on opposite sides of the circles and at right angles to the two zeros.

The declination circle 16 is perpendicular to the plane of the hour angle arc 15 and rotates about its axis. Such rotation is measured on the hour angle arc, and Figure 1 shows this arc as being graduated in hours from zero to twelve. The graduations could be in degrees or other units if desired.

The latitude arc 20 is perpendicular to and rigidly attached to the hour angle arc. The arc 20 is graduated in degrees from zero to ninety, although other types of graduations could be adapted.

The leveling device 27 is attached to and is free to rotate about the axis of the latitude arc 20. This rotation is measured on the latitude arc.

The reading of the declination circle 16 is zero degrees in the two positions of the telescope 1 where the collination axis of the telescope is parallel to the plane of the hour angle arc 15. The hour angle arc reads zero in the two positions where the declination circle is parallel to the latitude arc. The hour angle arc 15 may be graduated in either time or arc units. I have shown two rows of graduations, these increasing in opposite direction. The latitude arc 20 reads zero when the axis of the leveling device 27 is parallel to the plane of the hour angle arc 15 and reads ninety degrees when the axis is perpendicular to the plane of this arc. The cross wires 6 in the focal plane of the telescope objective mark the collimation axis of the telescope.

By means of a series of total reflection prisms or mirrors and suitable lenses as already described, an image of the bubble cell or of horizons from either type of leveling device is formed in the focal plane of the telescope objective and is seen superimposed upon the image of the astronomical body under observation. The central ray of this optical path passes from the bubble cell or the horizon type of leveling device along the axis of the leveling device to the axis of the latitude arc and then along the axis of this arc to the axis of the hour angle arc. Along the axis of the hour angle arc, the ray passes to the axis of the declination circle, and then along this axis to a reflecting surface immediately in front of or behind the objective, and from there to the focal plane of the objective. Suitable lenses bring the rays to a focus in the focal plane.

The axis of the declination circle is enclosed and offset a distance from the hour angle arc in order that it may be used as a handle for the instrument when observing. Suitably shaded glasses 28′ are placed in front of the telescope to reduce the light of the sun when that body is observed.

For latitude: Set off the apparent declination of the astronomical body on the declination circle 16. Set off the apparent hour angle (or an assumed apparent hour angle) on the hour angle arc. The bubble or intersections of horizon lines may now be kept centered while rotating the whole instrument about a vertical axis as in the hour angle problem. The collimation axis of the telescope again sweeps out an almucantar. The altitude of this almucantar may be altered until it passes through the astronomical object by varying the reading on the latitude arc 20, the ray from either leveling device being kept centered on the collimation axis while this is being done. When the astronomical body and the ray from either leveling device are both centered in the telescope 1, then the reading of the latitude arc 20 is the solution for the latitude of an astronomical triangle which contains the assumed hour angle and the observed body's apparent zenith and polar distances.

For line of position: Make observation as in the paragraph on the hour angle problem or on the latitude problem. Combine observed (or assumed) hour angle with the Greenwich apparent time if the sun is observed, or with Greenwich sidereal time and the objects right ascension if any other object is observed, in order to get the corresponding longitude. Plot this longitude and the latitude which was assumed or observed as the case may be. Make another observation with a different value of the assumed quantity, and plot the resulting longitude and latitude in the same way. A line drawn through these two points is the line of position or the "Sumner line".

Although I have shown and described two embodiments of my invention, it is to be understood that the same is susceptible of various changes, and I reserve the right to employ such changes as may come within the scope of the invention as claimed.

When it is desired to find the hour angle, the operator sets off the apparent declination of the astronomical object to be observed on the decination circle 16. To obtain the correct declination for any given time, a nautical almanac or astronomical ephemeris is consulted. After the proper declination has been set on the circle 16, the latitude or the assumed latitude is set off on the latitude arc. In case the observation is being made on a ship, the latitude can be assumed by dead reckoning, i. e. by estimating in the usual manner the probable course and distance made good from the last known position.

The bubble or intersection of the horizons can now be kept centered in the circle 26 and maintained in the field of view while the instrument is rotated about a vertical axis. When this is done, the collimation axis of the telescope sweeps out an almucantar (small circle parallel to the horizon). By adjusting the hour angle arc setting, the altitude of this almucantar can be varied and in general made to pass through the astronomical body. The astronomical body and the bubble 25 or the horizons can then be made to coincide with the center of the telescope field.

When this is accomplished, the reading of the hour angle arc is now the apparent hour angle of the body, which would be obtained by solution of an astronomical triangle containing the assumed latitude and the body's apparent zenith and polar distances.

I claim:

1. An instrument comprising a circular member having graduations thereon for indicating the declination of a celestial object, a telescope swingable about the axis of said member and having its axis lying parallel with the plane of said member at all times, a semi-circular member extending at right angles to said first named member and lying in a plane disposed parallel to the zero reading on the declination member, said semi-circular member being graduated in time periods, a quadrant extending at right angles to said semi-circular member and being rotatable about the axis of said semi-circular member and rotating said semi-circular member therewith, said quadrant being graduated in degrees, a leveling device rotatable about the axis of said quadrant, and reflectors for carrying light rays from the leveling device to the telescope regardless of the positions of the various parts.

2. An instrument comprising a declination circle, a telescope rotatably mounted thereon, an hour angle arc disposed at right angles to the circle, a latitude arc disposed at right angles to the hour angle arc, a leveling device swingable about the axis of the latitude arc, and means for rendering said leveling device visible through said telescope.

3. An instrument comprising a declination circle, a telescope rotatably mounted thereon, an hour angle arc disposed at right angles to the circle, a latitude arc disposed at right angles to the hour angle arc, a leveling device swingable about the axis of the latitude arc, and reflectors for carrying light rays from the leveling device to the telescope.

4. An instrument comprising a hollow handle, a declination circle rigidly secured to said handle and having its axis aligned with the axis of said handle, a telescope swingable about the declination circle, an hour angle arc rotatably mounted at right angles to said declination circle, a latitude arc disposed at right angles to said hour angle arc and being rigidly connected thereto, a leveling device disposed at right angles to the axis of the latitude arc and being swingable therearound, and means for rendering said leveling device visible through said telescope.

5. An instrument comprising a hollow handle, a declination circle rigidly secured to said handle and having its axis aligned with the axis of said handle, a telescope swingable about the declination circle, an hour angle arc rotatably mounted at right angles to said declination circle, a latitude arc disposed at right angles to said hour angle arc and being rigidly connected thereto, a leveling device disposed at right angles to the axis of the latitude arc and being swingable therearound, and reflectors for carrying light rays from the leveling device to the telescope.

6. In a position finder of the character described, an hour ring, means for adjusting the same to lie in the equatorial plane in a fixed position, and a member revolvable on the ring having a telescope associated therewith, the hour ring being graduated to indicate the angular distance between the meridian plane of the observer and that of a celestial body when the telescope is pointed at said body.

7. In a position finder of the character described, an hour ring, means for adjusting the same to lie in the equatorial plane in a fixed position, a member revolvable on the ring having a telescope associated therewith, the hour ring being graduated to indicate the angular distance between the meridian plane of the observer and that of a celestial body when the telescope is pointed at said body, and means for rendering said adjusting means observable through the telescope.

8. In a position finder of the character described, an hour ring, means for adjusting the same to a fixed position in a plane intersecting the equatorial plane and bearing reference to the latitude of the observer, and a member revolvable on the ring having a telescope associated therewith, the hour ring being graduated to indicate the angular distance between the meridian plane of the observer and that of a celestial body when the telescope is pointed at said body.

9. In a position finder of the character described, an hour ring, means for adjusting the same to a fixed position in a plane intersecting the equatorial plane and bearing reference to the latitude of the observer, a member revolvable on the ring having a telescope associated therewith, the hour ring being graduated to indicate the angular distance between the meridian plane of the observer and that of a celestial body when the telescope is pointed at said body, and means for rendering said adjusting means observable through the telescope.

10. In a position finder of the character described, an hour ring, means for adjusting the same to lie in the equatorial plane in a fixed position, a member revolvable on the ring having a telescope associated therewith, and means for adjusting the telescope to lie in a plane intersecting the plane of the ring at an angle bearing reference to the declination of the object at the time of observation, the hour ring being graduated to indicate the angular distance between the meridian plane of the observer and that of a celestial body when the telescope is pointed at that body.

11. In a position finder of the character described, an hour ring, means for adjusting the same to lie in the equatorial plane in a fixed position, a member revolvable on the ring having a telescope associated therewith, means for adjusting the telescope to lie in a plane intersecting the plane of the ring at an angle bearing reference to the declination of the object at the time of observation, the hour ring being graduated to indicate the angular distance between the meridian plane of the observer and that of a celestial body when the telescope is pointed at that body, and means for rendering said former adjusting means observable through the telescope.

12. In a position finder of the character described, an hour ring, means for adjusting the same to a fixed position in a plane intersecting the equatorial plane and bearing reference to the latitude of the observer, a member revolvable on the ring having a telescope associated therewith, and means for adjusting the telescope to lie in a plane intersecting the plane of the ring at an angle bearing reference to the declination of the body at the time of observation, the hour ring being graduated to indicate the angular distance between the meridian plane of the observer and that of a celestial body when the telescope is pointed at that body.

13. In a position finder of the character described, an hour ring, means for adjusting the same to a fixed position in a plane intersecting the equatorial plane and bearing reference to the latitude of the observer, a member revolvable on the ring having a telescope associated therewith, means for adjusting the telescope to lie in a plane intersecting the plane of the ring at an angle bearing reference to the declination of the body at the time of observation, the hour ring being graduated to indicate the angular distance between the meridian plane of the observer and that of a celestial body when the telescope is pointed at that body, and means for rendering said former adjusting means observable through the telescope.

14. In a position finder of the character described, an hour ring, leveling means associated therewith, means for adjusting the leveling means relative to the hour ring, a member revolvable on the ring and having a telescope associated therewith, and means for adjusting the telescope relative to said member.

15. In a position finder of the character described, an hour ring, leveling means associated therewith, means for adjusting the leveling means relative to the hour ring, a member revolvable on the ring and having a telescope associated therewith, means for adjusting the telescope relative to said member, and means for rendering the leveling means observable through the telescope.

HOWARD B. KASTER.